United States Patent [11] 3,539,028

[72] Inventor Otto C. Krolopp
 Villa Park, Illinois
[21] Appl. No. 748,678
[22] Filed July 30, 1968
[45] Patented Nov. 10, 1970
[73] Assignee Blaw-Knox Company
 Pittsburgh, Pennsylvania
 a corporation of Delaware

[54] WEIGHING APPARATUS WITH AUTOMATICALLY OPERATED ROTARY WEIGH BUCKET
6 Claims, 3 Drawing Figs.

[52] U.S. Cl. ............................................. 177/83,
 177/114
[51] Int. Cl. ........................................ G01g 13/22,
 G01g 13/28
[50] Field of Search ............................... 177/83—
 88, 114, 115, 121, 210, 211

[56] References Cited
UNITED STATES PATENTS
2,191,711 2/1940 Godat............................ 177/87X
2,299,636 10/1942 Mansbendel................. 177/87X
3,090,453 5/1963 Rosen........................... 177/121X
3,091,301 5/1963 Stone............................ 177/121X
3,319,728 5/1967 Johansson et al............. 177/87X
FOREIGN PATENTS
167,834 6/1956 Australia....................... 177/87
1,093,111 11/1967 Great Britain................ 177/121

*Primary Examiner*—Robert S. Ward, Jr.
*Attorney*—Parker, Carter & Markey

ABSTRACT: Apparatus for weighing out quantities of particulate material having a predetermined weight, of the general type embodying a rotary compartmented bucket for receiving and dumping the measured quantities. The entire bucket assembly is supported by transducer means which senses the weight of delivered material and both triggers the indexing of the bucket to dump the material and controls the operation of the means for feeding material to the bucket throughout each cycle of operation.

Patented Nov. 10, 1970

3,539,028

INVENTOR

BY James E. [signature]
ATTORNEY

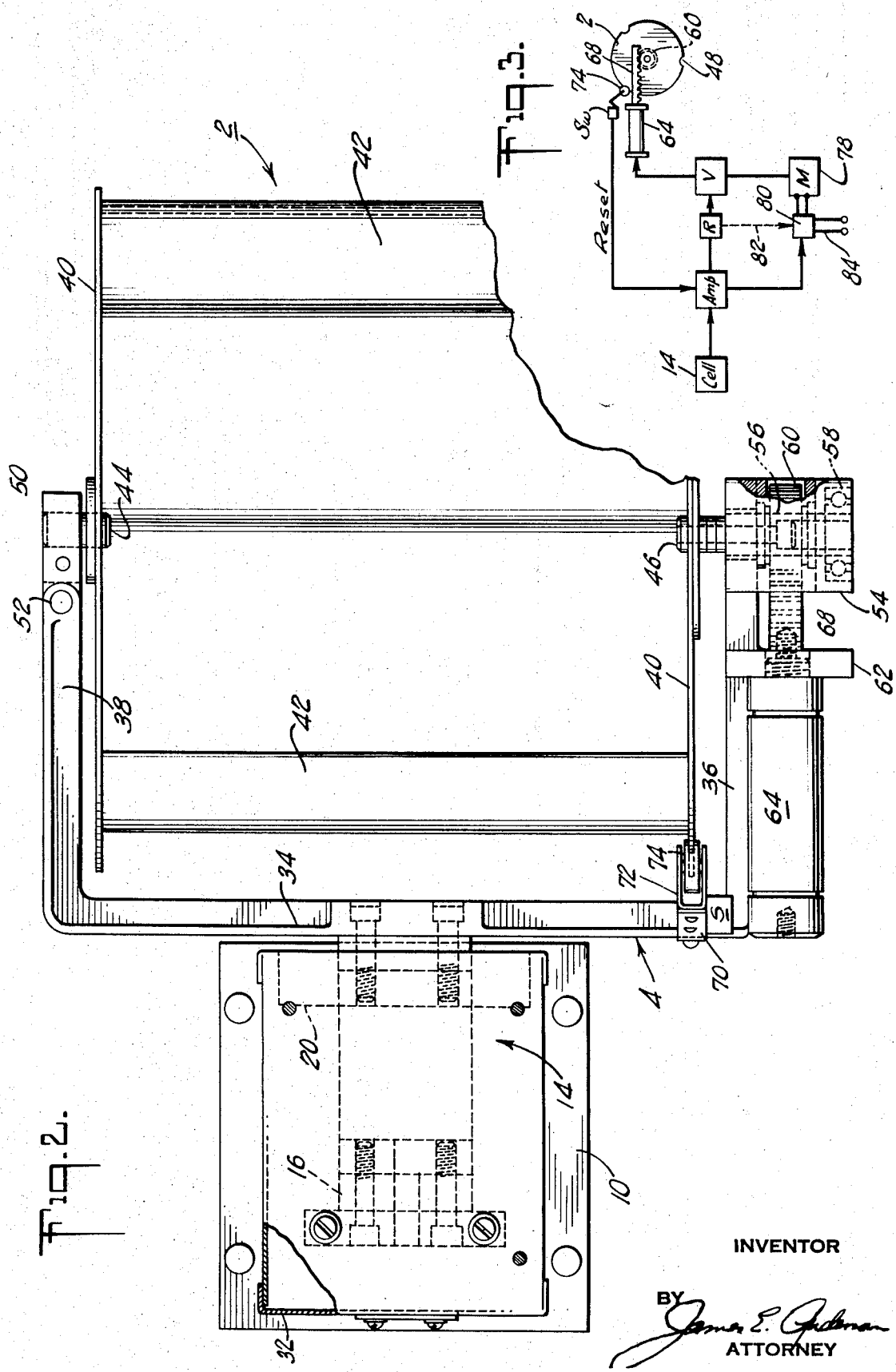

3,539,028

WEIGHING APPARATUS WITH AUTOMATICALLY OPERATED ROTARY WEIGH BUCKET

FIELD OF INVENTION

This invention relates to net weighing apparatus, and more specifically to apparatus for automatically weighing and dispensing individual quantities of particulate material in predetermined weights.

BACKGROUND OF THE INVENTION

In the prior art, a well-known weighing apparatus is of the compartmented rotary hopper type which has been manufactured by Blaw-Knox Company as part of its "Gump" equipment line. Such a net weigher is disclosed in the Nowak U.S. Pat. No. 3,224,515, dated Dec. 21, 1965. In this prior art weigher, a rotary "bucket" or "hopper" has three compartments into which particulate material is fed. Through a delicate cantilever mechanism the net weight of the accumulated material delivered into the bucket is sensed, and the dumping thereof into a suitable receptacle is effected by rotative indexing of the bucket when, through actuation of a switch, this mechanism senses that a predetermined net weight has been delivered. At approximately the instant at which this indexing is initiated, the supply of material into the bucket is temporarily interrupted until a succeeding empty compartment is brought into receiving position. The aforesaid mechanism for sensing the accumulation of a desired predetermined mass, and for triggering indexing of the bucket, has been in the nature of a delicate mechanical movement and therefore subject to inherent disadvantages. Among these disadvantages are sensitivity to dirt, vibration and other local conditions. Also, being inherently an "on" or "off" mode of operation, this mechanism is limited in its capability to affect operation of the material feeding means.

OBJECTS OF THE INVENTION

It is the principal object of this invention to provide weighing apparatus that affords both a greater degree of accuracy in uniformly weighing out quantities of predetermined weight, and greater capacity in terms of weight measured and delivered per unit of time. An ancillary objective is to provide weighing apparatus which is minimally affected by dirt, vibration or other local conditions.

SUMMARY OF THE INVENTION

Briefly, in accordance with this invention the delicate mechanical movement for suspending the rotary bucket and indexing parts is eliminated, and there is substituted therefore a novel means which is essentially electronic in nature. More specifically, the entire bucket assembly is supported by transducer means for producing a continuously variable output signal which is a function of the net weight of particulate material delivered into the bucket as of any given instant. In the hereinafter described preferred embodiment of this invention, the transducer means comprises an electrical load cell which emits a variable output which is utilized for the twofold purposes of controlling the feed of the feed means and for finally triggering the dumping action of the bucket. A unique feature in this weighing apparatus is the ability to run the feed means at a very fast rate throughout most of a cycle while constantly sensing when a predetermined delivered weight is being approached, and tapering off the feed rate down to zero correctly at the instant when the desired weight of material has been delivered. Thus the loading of successive compartments can be achieved more rapidly, and more accurately, than in the currently known commercial version of this general type of apparatus.

By virtue of this invention, accuracies of plus or minus 0.2 percent are attainable while handling typical types of particulate material in the range of 0.5 to 3.0 pounds per measured quantity. In part, this marked advantage is attributable to the dependability of the simple transducer sensing means as compared with a sensitive mechanical arrangement of levers, pivots, switches, etc.

BRIEF DESCRIPTION OF THE DRAWINGS

Further objects, advantages and details of the invention will become apparent from the following description when read with reference to the accompanying drawings in which:

FIG. 2 is a plan view of only the weighing apparatus as shown in FIG. 1; and

FIG. 3 is a schematic diagram of the system for controlling operation of the weighing and feeding apparatus.

DESCRIPTION OF THE PREFERRED EMBODIMENT

Figure 1:
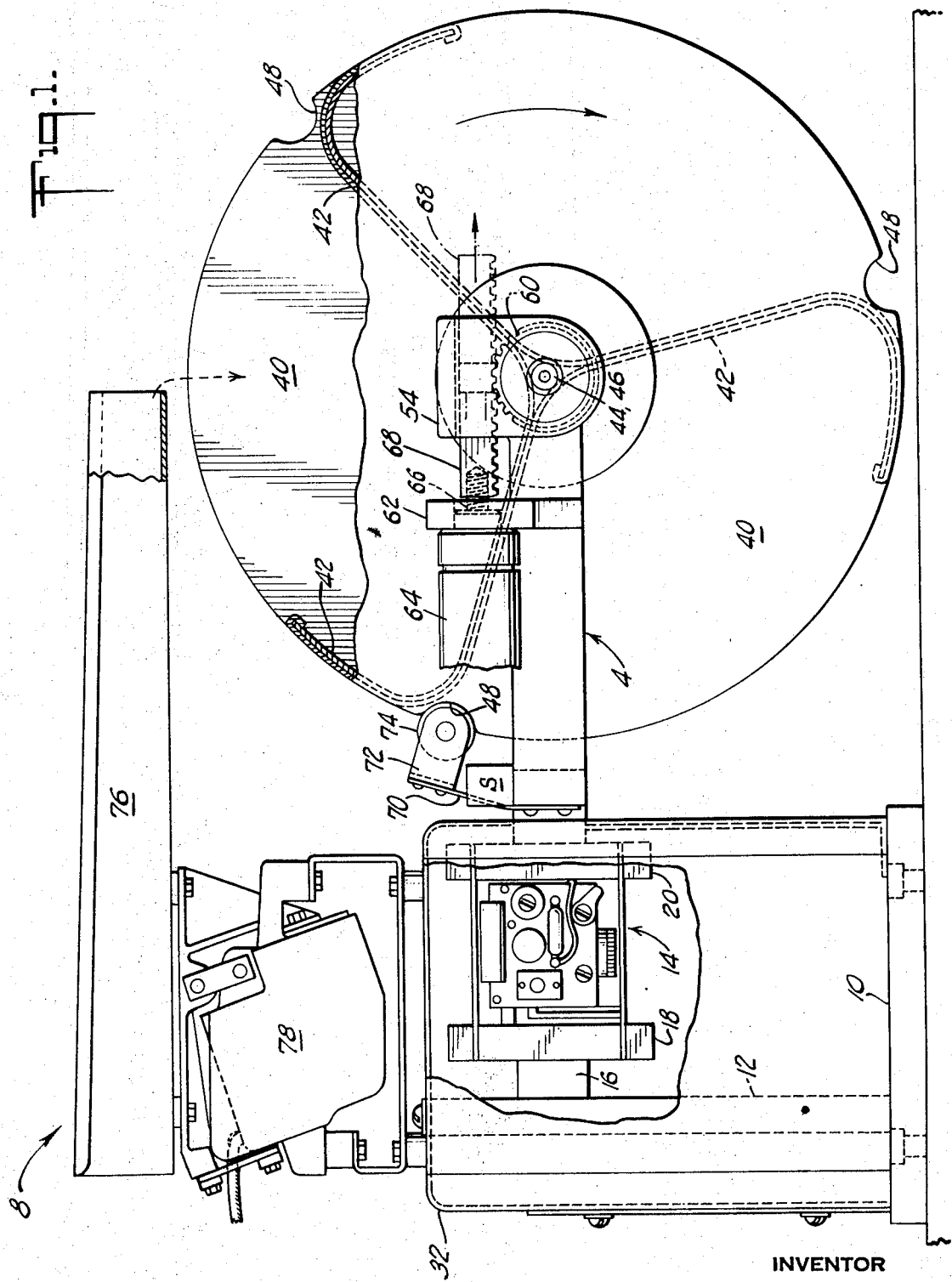
FIG. 1 is a side elevation of the weighing apparatus in combination with vibratory feeding apparatus.

The main components of this system comprise a compartmented rotary receptacle, generally indicated at 2, which is commonly referred to in the art as the "weigh bucket"; a cantilevered yoke structure 4 which supports the bucket 2; a load responsive transducer unit 6 from which the yoke 4 is supported; and a standard vibratory feeder 8. As will be described more fully hereafter, the feeder 8 delivers particulate material by means of vibration, as is well known in the art, to fall into compartments in the bucket 2. The delivery of material from the feeder 8 to the bucket 2 may be stopped substantially instantaneously by interruption of the vibratory feeding action. By means which are responsive to the weight of the material delivered to a given compartment of the bucket 2, the bucket is caused to rotate abruptly 120°, thereby to dump the material when that predetermined mass thereof has been delivered. When the dumping thus initiated has been completed, the vibratory feeder 8 is reactivated to resume the feeding of material to the next compartment in the bucket.

Proceeding now to a more detailed description of the components of the apparatus, the rotary weighing apparatus is mounted on a housing having a base 10 and an upstanding rigid bracket 12. A critical element to the present invention is a transducer, generally indicated at 14. The function of the transducer 14 is to receive physically a variable force and to convert this to an output signal which is a function of that varying force. In the practice of this invention it has been found that a standard load cell, Model PB-60, manufactured by the Radson Engineering Corporation (of Morton Grove, Ill.) is suitable for this purpose. Load cell 14 comprises a stationary first block assembly 18 and a block assembly 20 which is resiliently supported from the assembly 18 by means of spring-like leaf plates 22. Mounted on the stationary block assembly, independently of plates 22, is an electronic sensing unit 24. Load cell 14 produces an electrical output signal which is a linear function of the force of gravity of the net contents in the bucket 2. The utilization of this signal from the load cell in accordance with the present invention will be described later in this specification. Block assembly 20 extends freely through an opening in a housing cover 32, and is affixed to the yoke 4.

The yoke 4 comprises a common cross member 34 with integral spaced and parallel arms 36 and 38 extending horizontally therefrom. Mounted on the yoke 4 is the bucket 2, which comprises spaced circular end plates 40 connected by curved sheet metal pans 42 which divide the bucket into a plurality of compartments, there being three 120° compartments in this illustration of the invention. Pans 42 preferably have a highly polished smooth finish, and would typically be made stainless steel for sanitary reasons. By virtue of the particular configuration of these compartments, as evident in FIG. 1, the dumping action is improved, and the operating capacity of each compartment is increased. The end plates 40 have stub shafts 44 and 46, respectively, whereby the bucket is rotatably mounted and driven. At the one side, shaft 44 is journaled in a bearing 50, which is pivotally secured to arm 38 on a vertical hinge 52. At the other side, the shaft 46 fits into a splined sleeve 56 which is journaled in a ball bearing 58 carried by an extension arm 54. This arrangement is designed to permit easy removal of the complete bucket 2 from the yoke 4. A standard combination pinion and one-way clutch 60 coacts with the sleeve 56, being adapted to rotate the sleeve and bucket clockwise only (as viewed in FIG. 1), but to idle when the pinion is driven counterclockwise. This clutch may be of the well-known disc and wedge type.

Another bracket extension arm 62 has screwed into it and thereby mounts a pneumatic piston and cylinder unit 64. Pneumatic cylinder 64 has a reciprocable driving rod 66 connected to a toothed rack 68 which meshes with the gearing of the combined pinion and clutch unit 60. Thus, the extension of rod 66 toward the right (in FIG. 1) effects the indexing of the bucket 120° in a clockwise direction, while the pinion idles upon the return stroke of the cylinder.

The one bucket end plate 40 is provided with three detents 48. A leaf spring 70 secured to the yoke carries a fork 72 in which is rotatable a cam roller 74 that rides on the contour of its associated bucket end plate 40. The principal function of the cam roller 40 is to bring the bucket to rest at its properly indexed position at the end of each indexing motion. A secondary function is the operation of a switch S, for reasons which will appear from the description hereafter.

The vibratory feeder 8 is a standard piece of equipment. Such a feeder comprises a feed tray or chute 76 which is mounted on a body 78 containing a motor for effecting vibratory feeding action of the tray 76. The particulate materials to be weighed into predetermined quantities are delivered to the tray 76 by conventional means, not shown.

Referring next to FIG. 3, this is a schematic representation of the overall control system coordinating the operation of the vibratory feeder and rotary weighing apparatus. Each of the components of this control system is well-known and available commercially, and, therefore, will not be described in detail in the interest of brevity. In operation, as the vibratory feeder 8 is delivering particulate material to the bucket 2, the moment of force transmitted to the load cell 14 through the yoke 4 progressively increases as a function of the accumulated weight of material delivered at any given instant. The electrical output of the load cell 14, therefore, varies as a function of the weight of material in the bucket 2. This output from the load cell 14 is communicated to an amplifier, designated "Amp." in FIG. 3. The output of the amplifier is connected to a relay R which is preset to trigger, at a given level of output from the amplifier, the operation of an air valve V. This valve is of the solenoid-operated type and, when energized, activates the air cylinder 64 to initiate indexing of the bucket 2. Thus, when the signal from the load cell 14 transmitted through the amplifier signals that a predetermined weight of material has been delivered to the bucket, the relay R effects operation of the valve V to initiate dumping of that desired quantity of delivered material. If desired, a relay may be placed in this system to delay dumping and reactivation of the feeder 8 until a signal is received from some other piece of equipment, such as a packaging machine which will receive the batch of material.

The speed of the motor M, for the vibratory feeder, can be varied automatically through a control unit 80, which may be a rheostat, for example. The variable output from the amplifier is also transmitted to this control unit 80. As the signal from the load cell 14 indicates a rate of increase in the weight of accumulation of material in the bucket, the output from the amplifier causes control unit 80 to gradually slow down the vibratory feed motor M. Ideally, when precisely the desired weight of material has been delivered to the bucket, at that instant the rate of feeding of tray 76 will have slowed down to zero. If desired, however, the relay R, or a similar relay control, may be connected (as indicated by line 82) to switch off the motor M at the same instant that the indexing of the bucket is initiated. A variation contemplated within the scope of this invention is the operation of the system to effect what is known as a "bulk and dribble feed," wherein the feeder is operated first at a rapid rate and then is slowed down to a slow rate at some point midway through each cycle.

In summary of the above, when a predetermined weight of particulate material has been delivered into a compartment of the bucket 2, the load cell 14 signals the amplifier to operate the air valve V, at which instant the vibratory feeder 8 will have slowed down to the point where the delivery of material has ceased. Thereupon, air cylinder 64 will effect 120° rotation of the bucket 2. At the completion of each indexing motion, as the bucket comes to rest the spring biased cam roller 74 drops into a detent 48. As this happens, the switch S is operated. A function of this switch S, upon completion of indexing, is to reset the overall system by reactivating the vibratory feed motor M.

In actual practice it has been found that in a rotary weighing system according to this invention, accuracies in the measuring of weighed quantities of the order of plus or minus 0.2 percent have been consistently achieved. This is attributed principally to the continuous sensitivity of the transducer, and utilizing its output to reduce the feeding of a material down to zero at virtually the instant when the desired weight of material has been measured into the bucket. This continuous sensitivity and control function is in contrast to prior art arrangements which depend upon weigh beams and the like and upon triggering by the closing of switches or mechanical actions. Among the disadvantages of such arrangements is the inertia of the parts involved. In the apparatus according to this invention, during the sensing of the weight in the bucket, and until after indexing thereof has been triggered, there are no similar movements of mechanical parts.

It will be understood that various departures from the specifically disclosed embodiment of the invention may be effected without departing from the scope thereof as defined by the following claims.

I claim:

1. Weighing apparatus comprising means defining a compartment for receiving a quantity of particulate material, a structure supporting said compartment-defining means for operation thereof to dump said material, actuating means associated with said compartment-defining means and operable to effect said dumping thereof, and transducer means at least partially supporting said structure and responsive to the weight thereof, the output of said transducer being connected to said actuating means and being adjusted responsive to said weight to trigger the operation of said actuating means.

2. Apparatus according to claim 1, including means for feeding said material to said compartment, said feeding means being connected and responsive to said output of the transducer means and having its operation controlled thereby.

3. Weighing apparatus comprising a rotary compartmented weigh bucket, a structure rotatably supporting said bucket, actuating means operable to rotate said bucket to dump material therefrom, transducer means at least partially supporting said structure and responsive to the weight thereof, said transducer means having its output connected to said actuating means and being responsive to accumulation of a predetermined weight of material in said bucket to trigger the operation thereof.

4. Weighing apparatus according to claim 3, including means for feeding said material to said bucket, said feeding means being connected and responsive to said output of the transducer means and having its operation controlled thereby.

5. Weighing apparatus according to claim 2, said feeding means is operative at a variable rate of feed, said transducer output being continuously responsive to increasing weight of material to progressively reduce said rate of feed.

6. Weighing apparatus comprising a rotary compartmented weigh bucket, a structure rotatably supporting said bucket, actuating means operable to rotate said bucket, means for feeding particulate material to said bucket at a controllable variable rate of feed, transducer means at least partially supporting said structure and responsive to the weight thereof to emit an electrical output signal which is a function of said weight, and control means receiving said output and responsive to progressively increasing weight of material in said bucket to reduce said rate of feed and to initiate said actuating means.